United States Patent [19]

Dillard

[11] 4,173,370

[45] Nov. 6, 1979

[54] MINE VEHICLE WITH SWIVEL SEAT
[75] Inventor: Winford Dillard, Bluefield, W. Va.
[73] Assignee: A-T-O Inc., Willoughby, Ohio
[21] Appl. No.: 793,511
[22] Filed: May 4, 1977
[51] Int. Cl.² ............................................. B60R 21/00
[52] U.S. Cl. ..................................... 296/65 A; 296/68
[58] Field of Search ..................... 296/55 A, 55 R, 63, 296/68; 180/100, 101, 102, 111, 113, 82 R, 82 A

[56] References Cited

U.S. PATENT DOCUMENTS

| 3,104,911 | 9/1963 | James | 296/68 |
| 3,253,856 | 5/1966 | Ueda | 296/68 |
| 3,930,555 | 1/1976 | Iijima | 180/101 |
| 3,937,517 | 2/1976 | Donova | 296/68 |

Primary Examiner—Philip Goodman
Attorney, Agent, or Firm—Webster B. Harpman

[57] ABSTRACT

A mine vehicle such as a tractor or a scoop is provided with an operator's cab having a protective canopy and a side entrance way. A swivel seat is positioned in the cab with its back toward the side entrance way and arranged to prevent the operator from sticking his head out of the entrance way when the mine vehicle is in operation.

5 Claims, 3 Drawing Figures

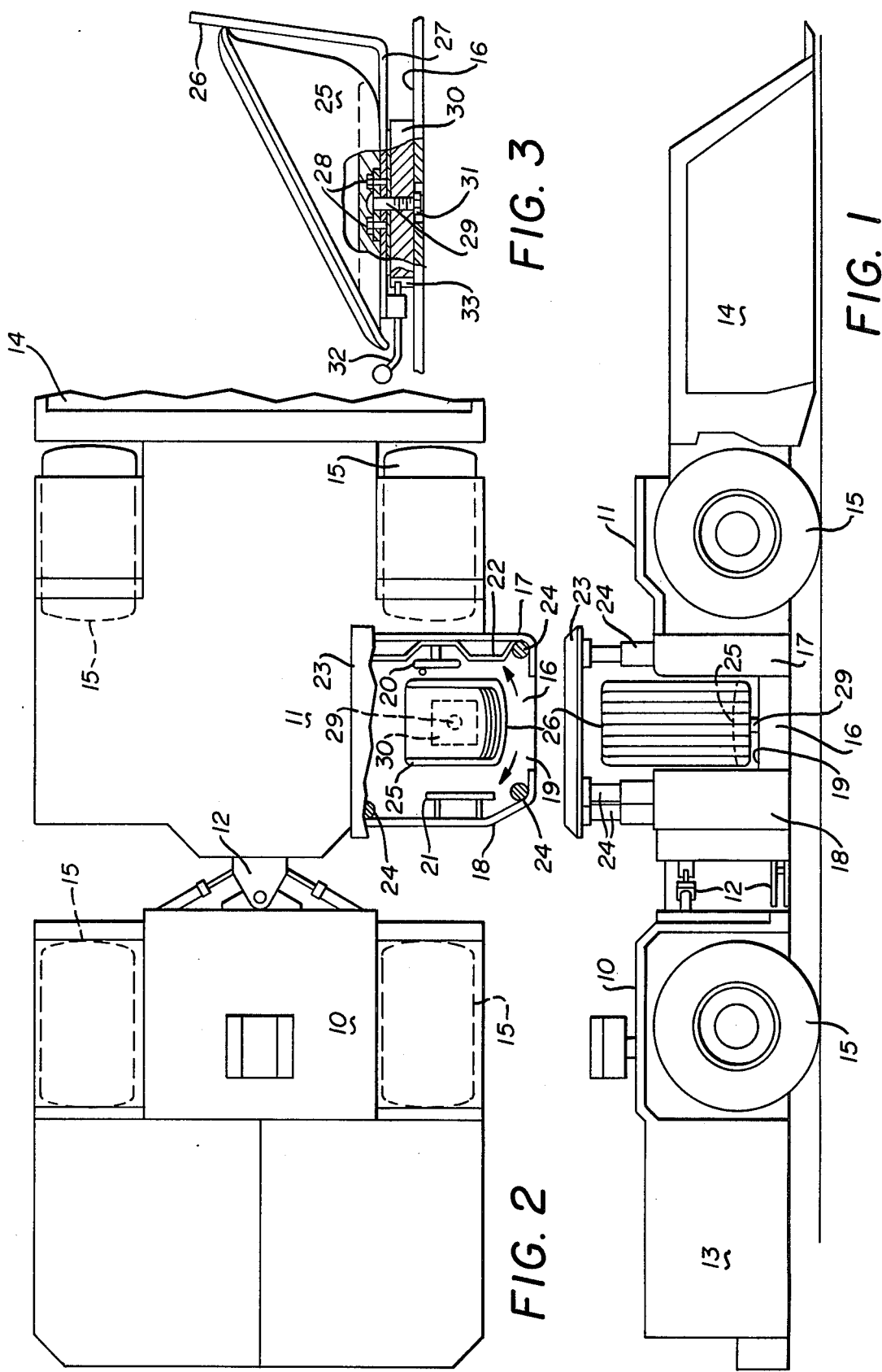

MINE VEHICLE WITH SWIVEL SEAT

BACKGROUND OF THE INVENTION (1) Field of the Invention

This invention relates to mine vehicles such as mine tractors and scoop vehicles which are electrically powered and used in coal mines and the like.

(2) Description of the Prior Art

U.S. Pat. No. 3,937,517 discloses a mine vehicle with a seat having an elongated back pivoted at its upper end to a canopy which includes a protective screen and bar arrangement, the canopy itself being pivoted to the vehicle so that upward motion of the seat moves the canopy upwardly. Conventional mine vehicles have not provided operator protection and a typical arrangement may be seen in U.S. Pat. Nos. 3,336,997 or 3,353,693.

The present invention provides a protective canopy over the operator's cab and locates a swivel seat with a high back in the cab in a position to block the entranceway and arranged so that turning the swivel seat to provide access to the entrance way brings it into engagement with control bars stopping the mine vehicle. The arrangement of the swivel seat and the operation of the same are not anticipated in the prior art U.S. Pat. No. 3,937,517.

SUMMARY OF THE INVENTION

A mine vehicle with a swivel seat assembly and control bars engagable thereby are arranged in a cab of a mine vehicle so that the operator must turn the seat to gain access to the cab and once seated in the seat is unable to get his head or arms out of the entrance way due to the blocking of the same by the high back of the swivel seat. Turning the swivel seat to either side to gain access to the entrance way brings the back of the seat into engagement with the control bars to stop the operation of the mine vehicle.

DESCRIPTION OF THE DRAWINGS

FIG. 1 is a side elevation of a mine scoop vehicle showing the cab canopy and swivel seat arrangement;

FIG. 2 is a top plan view of the mine vehicle of FIG. 1 with parts broken away and parts in cross section;

FIG. 3 is a side view of the swivel seat and its high back.

DESCRIPTION OF THE PREFERRED EMBODIMENT

In the form of the invention chosen for illustration and description herein, the mine vehicle with swivel seat and control mechanisms is illustrated in connection with a mine scoop.

As seen in FIG. 1 of the drawings, the mine scoop is an electrically operated articulated vehicle comprising wheeled structures 10 and 11 pivotally engaged at 12 to provide articulation and having a battery compartment 13 forming a large portion of the wheeled structure 10 and a scoop 14 forming a large portion of the wheeled structure 11. Each of the wheeled structures 10 and 11 are provided with a pair of driven ground engaging wheels 15. An operator's cab 16 is built into the wheeled structure 11 with a portion of the cab extending sidewardly of the vehicle as best seen in FIG. 2 of the drawings. Front and back walls 17 and 18 respectively define the front and back portions of the cab 16 and an entrance way 19 is located in the outer side of the cab 16 with the opposite or inner side formed by the wheeled structure 11 which carries the cab. A steering wheel 20 is positioned adjacent the front wall 17 and control bar assemblies 21 and 22 are mounted on the inner surfaces of the front and back walls 17 and 18 and arranged so that movement of the control bars toward the walls 17 and 18 respectively stop the operation of the mine vehicle. Conventional control pedals are also provided as will be understood by those skilled in the art.

A protective canopy 23 is positioned over the cab and spaced above the upper ends of the front and back walls 17 and 18 by vertical supports 24.

By referring to both FIGS. 1 and 2 of the drawings, it will be seen that a swivel seat 25 with a high back 26 is mounted on the floor of the cab 16 with the back 26 spaced inwardly a short distance from the entrance way 19 and arranged to substantially block the entrance way when the seat 25 and the back 26 thereof are in the position illustrated in solid lines in FIGS. 1 and 2.

By referring to FIG. 3 of the drawings a side elevation of the swivel seat 25 and the high back 26 may be seen and it will be observed that the seat is preferably a plastic molding with a seat cushion disposed therein, positioned in an L-shaped frame 27, the substantially vertical portion of which forms the high back 26 and the horizontal portion of which is attached to the seat 25 by fasteners 28. A pivot pin 29 is positioned through the central portion of the frame 27 and through a pivot block 30 and secured by a fastener 31 which may be located in a recess in the floor of the cab 16, all as shown in FIG. 3 of the drawings. A locking pin 32 is provided to permit the seat to be secured in fixed position if desired and is arranged so that one end of the same engages a notch 33 in the pivot block 30.

It will be observed that the normal position of the seat 25 and its high back 26 blocks entrance or exit from the cab and in particular prevents an operator from sticking his head or arms out of the side of the cab unless he first swivels the seat 25 and its back 26 and upon so doing the back 26 will engage either one of the control bars 21 and 22 and stop the mine vehicle if it is in operation.

The above described mine vehicle with swivel seat and control means engagable thereby, provides protection for the operator not heretofore found in mine vehicles or the like.

Although but one embodiment of the present invention has been illustrated and described, it will be apparent to those skilled in the art that various changes and modifications may be made therein and having thus described my invention what I claim is:

1. In a mine vehicle having operating controls and an operator's position, a partial enclosure defining said operator's position, an entrance way in said partial enclosure and a swivel seat having a high back positioned in said partial enclosure with said high back normally blocking said entrance way and arranged when moved to unblock said entrance way to engage said controls to stop the operation of the mine vehicle.

2. The improvement in a mine vehicle set forth in claim 1 and wherein a canopy is positioned over said operator's position in spaced relation to said partial enclosure so as to block entrance into said operator's position from above.

3. The improvement in a mine vehicle set forth in claim 1 and wherein said swivel seat comprises a seat portion and an L-shaped frame having a substantially horizontal portion and a substantially vertical portion, the substantially vertical portion of the L-shaped frame extending above said seat portion and forming the high back thereof.

4. The improvement in a mine vehicle set forth in claim 1 and wherein said operating controls comprise bars extending along the sides of said operator's position and positioned for engagement with said swivel seat when said seat is turned on said swivel.

5. The improvement in a mine vehicle set forth in claim 1 and wherein said entrance way is on the side of said vehicle and said swivel seat faces inwardly with respect thereto.

* * * * *